April 24, 1962 R. E. HALSTED 3,031,574
LUMINESCENT SYSTEM AND METHOD
Filed April 7, 1959
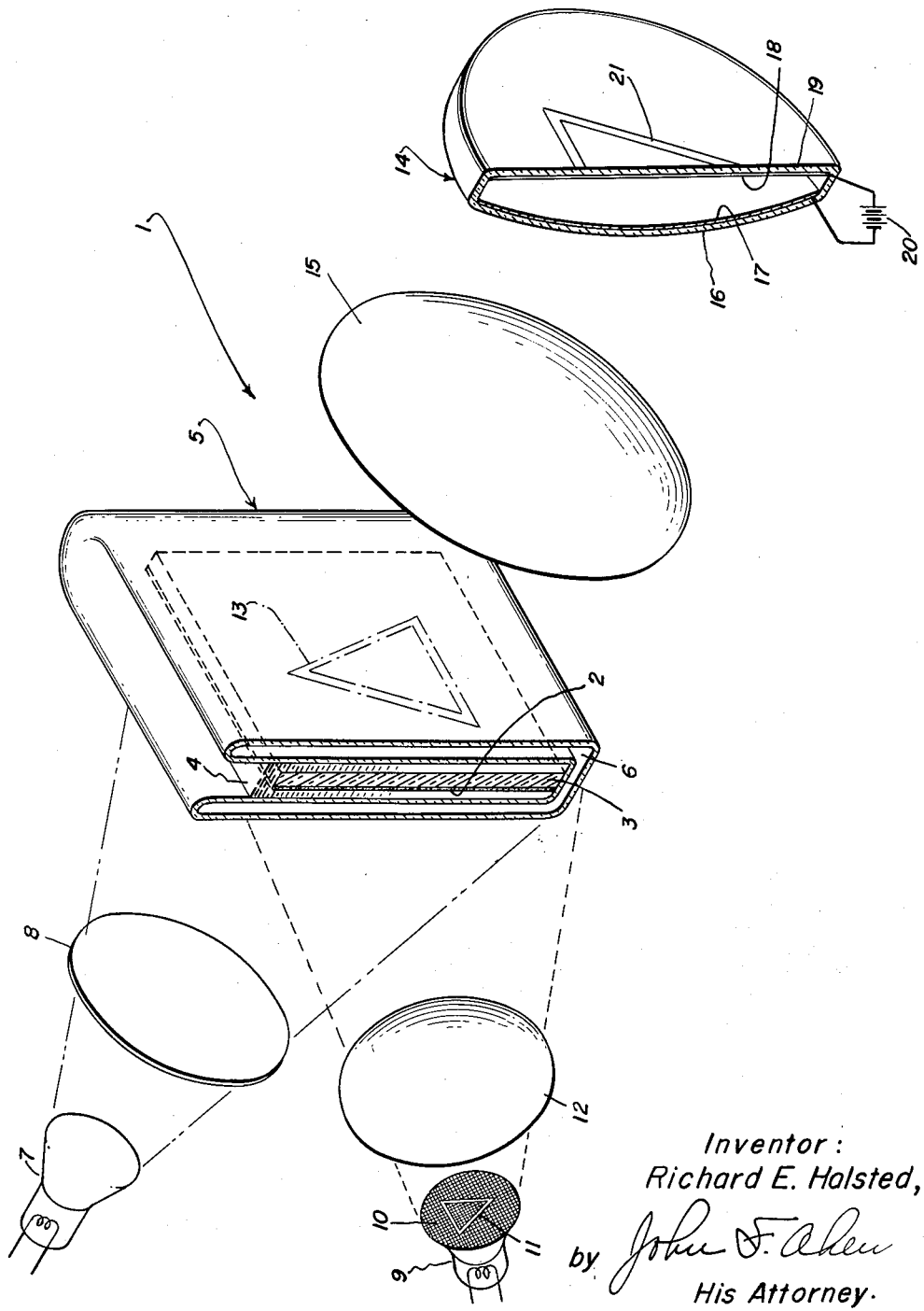
Inventor:
Richard E. Halsted,
by John F. Ahern
His Attorney.

3,031,574
LUMINESCENT SYSTEM AND METHOD
Richard E. Halsted, Burnt Hills, N.Y., assignor to General Electric Company, a corporation of New York
Filed Apr. 7, 1959, Ser. No. 804,832
6 Claims. (Cl. 250—80)

This invention relates to a light detection and indication system utilizing the direct conversion of light of one wavelength to light of a shorter wavelength in a single phosphor screen. In this application, the term "light" is to be given its broad meaning, viz., electromagnetic radiation in the infrared and ultraviolet bands as well as the visible light band of the spectrum.

While this invention has general application in systems involving the conversion of light of one wavelength from a source to be detected to light of a shorter wavelength, for clarity and brevity in explanation, a system involving the detection and conversion of light in the near infrared interval of the spectrum to visible light will be described. At present, the widest utility of the present invention involves such conversion.

Under certain conditions, it may be desirable or necessary to locate and identify many objects which radiate or reflect light of a particular wavelength with greater intensity than light of other wavelengths. As an example, it may be desired to locate a warm object which radiates light in the infrared band of the spectrum with considerable intensity while not emitting any visible light at all.

The optimum sensitivity of known, commercially available systems for detecting light of different wavelengths decreases by many orders of magnitude with increasing wavelength in the visible and near infrared spectral region. For example, the most sensitive commercially available detectors at 4000 A. and 8000 A., respectively, employ photoemissive surfaces. In these detectors, the light to be detected irradiates a material which emits electrons and these electrons can be detected or displayed by various electronic means. The optimum sensitivity of these detection devices at these respective wavelengths, however, is determined by the fact that the most sensitive photoemissive surface at 8000 A. must receive approximately 100 times as many light quanta to yield a detectable signal as the best photoemissive surface at 4000 A.

At 16,000 A., the most sensitive detector is a photoconductive material which requires approximately 100,000 times as many light quanta to produce a detectable signal as the best detector at 4000 A. Thus, considerable improvement in light detection could be achieved in a detector operable to detect light of longer wavelengths and having a sensitivity of the present detectors effective at much shorter wavelengths.

It is accordingly a principal object of my invention to provide a light indicating and detecting system of better sensitivity than heretofore achieved for indicating and detecting light of a predetermined wavelength.

It is another object of my invention to utilize for detection purposes, the production of light of a predetermined wavelength in a single luminescent screen in response to radiations of wavelength greater than the predetermined wavelength.

It is another object of my invention to facilitate the detection of light of a predetermined wavelength by the use of more sensitive light detection materials than heretofore available for detection at such wavelengths.

While the specification concludes with claims particularly pointing out and distinctly claiming the subject matter which I regard as my invention, it is believed the invention will be better understood from the following description taken in connection with the accompanying drawing in which the single figure of drawing illustrates in perspective the relative disposition of the several parts utilized in my invention.

In accordance with my invention, the foregoing objects are achieved in a light detector for detecting light of a relatively long wavelength by illuminating a phosphor screen with such light and simultaneously illuminating the screen with light from a fixed local source termed a power supply, to produce light output from the screen of a shorter wavelength than that from the detectable source. The light so produced is utilized to activate a detector of greatly increased sensitivity over the detector most sensitive at the wavelength of light received from the detectable source.

Referring now to the drawing for a detailed description of my invention, 1 designates generally the entire system embodying my invention which includes a phosphor screen 2 formed on one face of a light filter 3. For optimum response and function, the phosphor is maintained at a suitably low temperature achieved by immersing the phosphor and filter 3 in a bath of liquid nitrogen 4 contained in a flask 5. To minimize loss of coolant and the condensation of vapor on the exterior surfaces of the flask, it is preferably formed to have an evacuated space 6 in the respective walls thereof, thus providing thermal insulation between the interior of the flask and its exterior surfaces. The phosphor screen 2 is positioned so as to be illuminated by light from a power supply source 7 which may be an incandescent lamp. A suitable light filter 8 is interposed in the light path from source 7 so as to exclude all radiation but that in the desired interval of the light spectrum which may, for example, be of longer wavelength than 9000 A. The screen 2 is simultaneously exposed to light from a source to be detected, which may be virtually any source emitting or reflecting radiation in a certain interval of the spectrum but for simplicity of explanation, is shown as being an infrared lamp 9 with an opaque cover 10 having a triangular region 11 transparent to the light produced by the lamp. Thus, the region 11 forms an effective light source to be detected for the present purposes of explanation. Light from region 11 is focused upon the screen 2 by a lens 12 which causes inversion of the image of region 11 projected on screen 2 as represented by the triangle shown in phantom at 13 since it is not visible.

According to my invention, the phosphor screen 2 is responsive to the simultaneous illumination by light from source 7 and from source 11 to produce light of a wavelength shorter than that of the light from either of these sources. Such a phosphor may be one of the zinc-cadmium-mercury sulfoselenide-telluride family such as cadmium sulfide activated with copper, produced by procedures which minimize the formation of sulfur vacancies. In such a phosphor, three energy states exist in which electron transitions between the lowermost state of the three, to an intermediate state, occur in response to excitation by illumination from source 7 and a transition from the intermediate state to the uppermost state of the three occurs in response to excitation by the illumination from source 11. Thereafter, a transition occurs between the uppermost of the three energy states to another energy state which may be the lowermost of the three occurs, producing radiation of a wavelength shorter than that of the light of either of the sources 7 or 11. Since the energy states between which transitions occur are such that the intermediate state is less than ½ of the energy separation between the lowermost and uppermost of the three states, the light from the power supply source 7 is ineffective in causing transition between the intermediate energy state and the uppermost state. Thus, the output light cannot be produced without the simultaneous exposure of screen 2 to both light sources.

It is to be understood that the particular wavelength of the light from source 7 is not critical in performing the invention, it being necessary only that it be effective to produce the transition between two of the three energy states involved and that it does not of itself produce any transition productive of light in the interval of the spectrum in which the desired output light of screen 2 occurs nor that it, itself, be in this interval. Thus, in accord with my invention, light from source 7 may be in any band of the spectrum so that when it is superimposed on the phosphor screen with the detected light, an output radiation from the screen, utilizable with more sensitive detector materials then can be used for the detected light alone is produced.

The sensitivity of the system may be even further increased by interposing a light amplifier either in the path of the light from source 11 to screen 2 or in the path of the light from screen 2 to tube 14 or in both paths. Such an amplifier may be of a form substantially as shown and disclosed in the copending application of D. A. Cusano, Serial No. 665,707, filed June 14, 1957, and assigned to the assignee of this invention, wherein a phosphor material is sandwiched between conductive layers between which a direct potential is applied.

For providing a visible image of light source 11, a detector tube represented generally at 14 is provided and is responsive to the light output of screen 2. The light produced by screen 2 is filtered by filter 3 interposed in its path to detector 14, to pass only that wavelength of light which excites the tube 14. For focusing this light, a lens 15 is also interposed in this light path.

The tube 14 comprises a sealed, evacuated enclosure 6 of glass or other suitable material with an outwardly convex wall 16 exposed to the light from phosphor 2. Within the enclosure 14, and on the interior surface of wall 16 is a photoemissive screen 17, responsive to the light from phosphor 2 to produce emisison of electrons. The electrons are attracted to a cathodoluminescent screen 18 along the interior of another wall 19 of the enclosure by a potential applied between these screens by a direct potential source 20, having its positive terminal connected to screen 19 and negative terminal connected to screen 17.

Since the light emission of phosphor screen 2 is in accordance with its illumination by source 11 and the emission produced by screen 17 is in accordance with its illumination, the image 21 corresponding to light source 11 is reproduced on screen 19 and the effect of lens 15 is to cause inversion of the phantom image 13. Thus, image 21 is oriented corresponding to source 11.

In accordance with my invention, the light output from phosphor screen 2 is of a wavelength which permits choice of a material which produces many more useful electrons per incident quantum of radiation than a screen responsive directly to the radiation from source 11. Thus, the entire detector system is of high efficiency and therefore high sensitivity since the screen 2 is also of high sensitivity to light received from source 11.

In accordance with a specific embodiment of my invention usable as an infrared radiation detector of light of wavelengths less than 9000 A., light source 7 may be an incandescent lamp and filter 8 may be such as to pass light of greater than 9000 A. Under these conditions the screen 2 under simultaneous illumination by these sources produces light from approximately 4950 A. to 5650 A. in the green interval of the visible spectrum.

In addition to long wavelength, or infrared detection, the present invention has many uses. Thus, for example, under proper conditions, apparatus constructed in accord therewith may be incorporated with an incandescent light source to utilize some of the infrared radiation thereof, presently wasted, to produce visible light. Additionally, the generalized scheme of concurrent electromagnetic radiation and electric field stimulation, disclosed and claimed in the copending application of D. A. Cusano, Serial No. 665,707, filed June 14, 1957, and assigned to the present assignee, may be added to apparatus constructed in accord with the present invention to improve the efficiency thereof.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A luminescent system comprising a luminescent screen and means for illuminating said screen with light of a first wavelength, means for simultaneously exposing said screen to light of a second wavelength, said screen being responsive to the illumination thereof to produce light of a wavelength shorter than said first and second wavelengths and the light output of said screen being operative to produce a visible image of one of said light sources.

2. An apparatus comprising a light source, a phosphor screen and means for illuminating said screen with light from said source, said phosphor screen being responsive to the simultaneous illumination thereof by light from said source and from another source to produce light of a wavelength shorter than the wavelength of any incident light thereon and the light produced by said screen being operative to produce a visual image of said other source.

3. An apparatus comprising a source of light in a first band of the electromagnetic spectrum and a phosphor screen illuminated by light from said source, said screen being responsive to light in another band of the spectrum superimposed on said illumination in said first band to produce light in a third band of the spectrum in which the longest wavelength is shorter than the shortest wavelength in said other bands.

4. An apparatus comprising a source of light of a first wavelength and a luminescent screen positioned to be illuminated by said source, means for simultaneously illuminating said screen by a second light source, said screen being responsive to the simultaneous illumination thereof by said sources to produce light of a third wavelength shorter than the wavelength of light from said second source, said screen being unresponsive to illumination by light at said first wavelength to produce light at said third wavelength.

5. An apparatus comprising a light source, a phosphor screen and means for illuminating said screen with light from said source, said phosphor screen being responsive to the simultaneous illumination thereof by light from said source and from another source to produce light of a wavelength shorter than the wavelength of light from said other source, means responsive to the light produced by said screen to produce a visual image of said other source, said phosphor screen being unresponsive to illumination by light at said first wavelength to produce light at said third wavelength.

6. An apparatus comprising a luminescent screen responsive to light in a first interval of the spectrum having wavelengths less than a first value to excite said screen to a higher energy state, said screen in said higher energy state being responsive to light in a second interval of the spectrum having wavelengths less than a second value to produce light in a third interval of the spectrum having wavelengths less than either of said first or second values.

References Cited in the file of this patent

UNITED STATES PATENTS

| | | |
|---|---|---|
| 1,995,054 | Chambers | Mar. 19, 1935 |
| 2,395,099 | Cage | Feb. 19, 1946 |
| 2,430,232 | Lynch | Nov. 4, 1947 |
| 2,710,559 | Heitmuller | June 14, 1955 |
| 2,717,971 | Sheldon | Sept. 13, 1955 |
| 2,799,167 | Loconti | July 16, 1957 |

OTHER REFERENCES

Paul: Experiments on the Use of Infrared Sensitive Phosphors in Photography of the Spectrum, Journal of The Optical Society of America, March 1946; pages 175 to 177.

R.C.A. Review, June 1946; FIG. 15 opposite page 216.

Urbach et al.: On Infrared Sensitive Phosphors, Journal of The Optical Society of America, July 1946; pages 372 to 381.

Sommer: The Industrial Applications of Luminescence, Electronic Engineering, December 1946; page 361.